3,806,513
α-SUBSTITUTED INDOLIZINE PROPIONIC
ACID AND ITS SALTS
Allan Guildford Brown, Cranleigh, John Herbert Charles
Nayler, Dorking, England, assignors to Beecham Group
Limited, Brentford, Middlesex, England
No Drawing. Continuation-in-part of abandoned application Ser. No. 74,916, Sept. 23, 1970. This application Dec. 4, 1972, Ser. No. 311,466
Claims priority, application Great Britain, Oct. 4, 1969, 48,856/69
Int. Cl. C07d 31/34
U.S. Cl. 260—295 F 3 Claims

ABSTRACT OF THE DISCLOSURE

α - (3 - benzoyl-2-methylindolizin-1-yl) propionic acid and its pharmaceutically acceptable non-toxic salts as analgesic and anti-inflammatory agents.

This is a continuation-in-part of our co-pending application Ser. No. 74,916 filed Sept. 23, 1970, now abandoned, the contents of which are hereby incorporated herein by reference.

This invention relates to a new and useful indolizine derivative having valuable pharmacological activity as an analgesic and anti-inflammatory. The compound of the invention and its salts is unique in that it has excellent analgesic and anti-inflammatory activity with little or no significant or detectable adverse effect on the central nervous system or autonomic nervous system and no marked effect on the cardiovascular system at a normal dosage level of about 10–100 mg./kg.

The indolizine derivative of the present invention is represented by the Formula I:

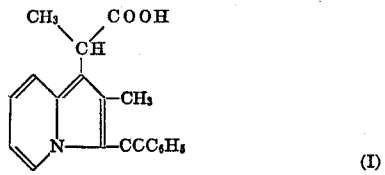

and its pharmaceutically acceptable non-toxic salts.

Examples of salts are alkali metal salts such as the potassium and sodium salts and the ammonium, quaternary ammonium and protonated amine salts.

The free acid of Formula I as produced by the process hereinafter described may be converted to its pharmaceutically acceptable non-toxic salts by conventional means. When administered to animals and humans the salts hydrolyze to produce in situ the pharmacologically active acid form. The acid form and its salts are formulated with carriers or vehicles of known composition to place the same in suitable dosage form.

The indolizine ring system may be synthesized by standard methods described in the chemical literature or is prepared according to the following reaction scheme:

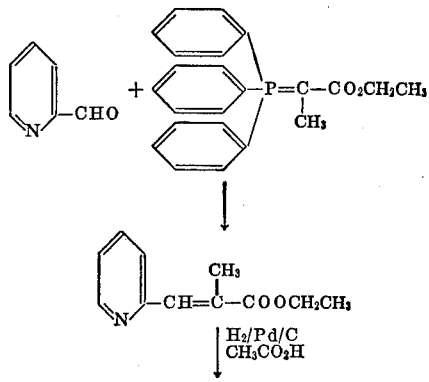

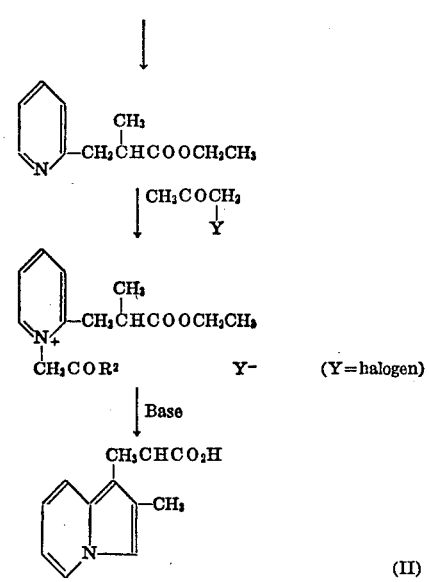

The intermediate II is produced by treating an ester of the acid of Formula II with a reacting acylating derivative of Formula III CH₃COOH (acetic acid) and thereafter de-esterifying the resulting ester by alkaline hydrolysis, the acylating derivative of Formula III being an acid halide such as the acid chloride or acid anhydride.

Compound II may then if desired be esterified or converted to a salt form prior to treatment with the reactive derivative of acid (III).

In tests carried out on mice and dogs the compound of the present invention has shown high levels of analgesic activity and good anti-inflammatory activity with little or no effect on the central nervous system or autonomic nervous system and no marked cardiovascular effects at normal dosage levels.

The tests which have been carried out are set forth below in connection with the acid form of the compound which is identified by the code number AI4884 which will be used in the test data. The tests comprised a first part relating to analgesic activity in the mouse and in the dog and a second part involving anti-inflammatory activity in dogs and comparing the same with aspirin. The tests also included C.N.S. effect and cardiovascular effects of compound AI4884 thereby demonstrating clearly that while compound AI4884 does in fact have good analgesic and good inflammatory activity it has no or very little effect on the central nervous system or autonomic nervous system and does not have any detectable cardiovascular effects at the dosage levels employed.

(1) ANALGESIC ACTIVITY OF AI4884

(A) Analgesic activity in the mouse (Phenylquinone Writhing Test)

Method: Groups of five mice (Ash TO male 18–22 g.) were observed for periods of 20 minutes immediately after the injection of a saturated solution of phenylquinone (2 mg./kg.), the testing time being stated as the time 10 minutes after the injection of phenylquinone. The total number of stretch responses (writhes) per group over the 20 minute time period was noted.

AI4884, administered orally as a suspension in 1% methyl cellulose, was tested for its ability to inhibit the frequency of writhes at half an hour after dosing. In all, 6 separate tests were performed on different days.

The mean number of writhes of three replicates at each dosage level was taken and compared with the mean of three controls, the controls and test observations being randomized throughout the day.

The results were expressed as percentage analgesia, that is 100 (4−T/C)

where

T=mean writhes for test dose
C=mean writhes for control dose

Graphs were drawn of percentage analgesia against dog dose and an $ED_{50}$ value noted for the compounds.

Results: The compound showed marked analgesic activity in this mouse analgesic test. Doses above 10 mg./kg. per os caused high activity while doses below this caused relatively low activity. The estimated $ED_{50}$ is 9.6 mg./kg. in this test.

(B) Analgesic activity in the dog (Bradykinin Test)

Method: Beagle dogs (9–14 kg.) were observed after an intraperitoneal injection of bradykinin (Sandoz) or kallidin and the resulting response was noted. The dose of bradykinin administered was about three times threshold value and ranged from 5–15 µg. depending on the sensitivity of the dog. This did not give a maximum response and yet enabled a graded reduction in response to be observed.

The typical distress response observed was characterized by a stiffness in walking, abdominal contractions, tail erection, stretching, whimpering, and snapping. This response was scored giving a point for each characteristic present. If any reduction in a characteristic occurred, only half a point was allotted.

The bradykinin was administered via an intraperitoneal cannula inserted before the start of the experiment. In all dogs the cannula was inserted without anaesthetic and the experiment was performed 1 hour later. All dogs were starved for 24 hours before the start of the experiment.

AI4884 was administered orally in gelatin capsules. As post-dose readings were compared with pre-dose readings each dog acted as its own control within one experiment. Control experiments have been performed in which no oral dosing occurred.

Graphs were drawn of score against time, a reduction in score after oral dosing being taken as a measure of the analgesic activity of the test compound.

Results: In this test AI4884 showed analgesic activity at 90 mg./kg. which compared with 200 mg./kg. and 250 mg./kg. for aspirin and phenacetin respectively.

(2) ANTI-INFLAMMATORY ACTIVITY

Method: The compound was administered orally to Charles River male rats one hour before the injection of 2% carrageenin subcutaneously into the plantar region of the left hind foot. Both hind feet volumes were measured in a calibrated mercury displacement volume recorder before dosing and three hours after the carrageenin injection. The difference in volume between right and left feet was calculated, before and after the carrageenin. The percent inhibition of inflammation by the test compound was thus calculated.

Results:

| Compound | Dose (mg./kg.) | Time (hours) | Percent inhibition of oedema |
|---|---|---|---|
| Aspirin | 300 | 1 | 44 |
| AI4884 | 100 | 1 | 47 |

Thus AI4884 at 100 mg./kg. exhibits anti-inflammatory activity equivalent to aspirin at 300 mg./kg. in this test.

(3) C.N.S. EFFECTS OF AI4884

A mouse General Observation Test was performed with AI4884, observations being made over a period of 24 hours.

The compound was tested for activity in the hexobarbital potentiation, maximal electroshock and anti-metrazol tests one hour after oral administration.

Results: Apart from mild depression at the very high dose of 500 mg./kg. as shown by the activity of AI4884 on potentiation of hexobarbiton sleeping time the compound showed little activity on central nervous system or the autonomic nervous system.

(4) CARDIOVASCULAR EFFECTS OF AI4884

Summary of preliminary experiments in anaesthetized dogs: Two dogs, anaesthetized with sodium pentobarbitone, were used to study the effects of intravenously administered compound AI4884 on the arterial blood pressure, heart rate, mean blood flow in femoral artery and respiratory airflow.

The compound was dissolved in polyethylene glycol (M.W. 200).

Individual doses of 0.1, 0.3, 2, 3, 10 and 30 mg./kg. were given to one dog (No. 125). The drug was infused to the second animal at a rate of 0.1 mg./kg. for 50 minutes (total 5 mg./kg.) and then at 1 mg./kg. for two periods of 50 minutes (a further 100 mg./kg. over 2.5 hours).

Polyethylene glycol was also given in single doses or as infusion (at the same rate used for drug) as a comparison.

Blood pressure: No significant changes occurred after the drug or the solvent alone.

Heart rate: There were no changes after doses up to and including 10 mg./kg. Any changes due to higher doses or to the infusions were masked by changes due to the solvent.

Mean blood flow in femoral artery: There appeared to be no difference in effects caused by the drug and solvent at doses up to 3 mg./kg.

Respiratory peak airflow: Single doses of 2 mg./kg. and above caused an increase in peak airflow. Slow infusion produced little or no effects. Solvents alone caused no changes.

Conclusions: In these tests AI4884 appears to show no marked direct cardiovascular effects up to 10 mg./kg. i.v. Also the drugs appeared to have no marked effect on the functioning of the autonomic nervous system.

The compound of the Formula I may be presented for use as a pharmacological agent either alone or together with other ingredients which may themselves be pharmacologically active agents or pharmaceutical excipients such as coloring, flavouring or bulking agents, solvents and carriers. Pharmaceutical preparations may be made for parenteral or oral use.

The following example illustrates the preparation of the compound of this invention:

EXAMPLE I

Preparation of α-(3-benzoyl-2-methylindolizin-1-yl) propionic acid (a) Preparation of ethyl α-methyl-β-(2-pyridyl) acrylate: All steps were carried out in an atmosphere of nitrogen. Ethyl bromopropionate (108 g.) was added, over 0.5 hour to a well stirred solution of triphenylphosphine (165 g.) in dry benzene (460 ml.) and the mixture kept at 70° for 2 hours and the solvent removed under vacuum. The product, α-carboethoxyethyltriphenyl phosphonium bromide (190.5 g.) in dry ethanol (700 ml.) was added in one portion to a solution of sodium (8.3 g.) in dry ethanol (670 ml.).

After 5 minutes this mixture was treated with a solution of 2-formylpyridine (31.7 g.) in dry ethanol (500 ml.) and the resulting mixture was kept at room temperature for 3 days, then the solvent was removed leaving a brown oil containing some white crystals. This oil was treated with a small portion of water and dissolved in benzene and extracted with 5% hydrochloric acid. The aqueous extract was made alkaline with potassium carbonate, with ice cooling, and the oil which separated was extracted with benzene. The extract was dried ($K_2CO_3$) and evaporated to yield ethyl α-methyl-β-(2-pyridyl) acrylate as a pale brown oil (46.4 g.), B.P. 148–152°/1 mm. (Found: N, 7.35%; $C_{11}H_{12}NO_2$ required N, 7.35%.)

(b) Preparation of ethyl α-methyl-β-(2-pyridyl) propionate: A solution of 46.3 g. of ethyl α-methyl-β-(2-pyridyl) acrylate (prepared in step (a)) in glacial acetic acid (230 ml.) was reduced with hydrogen in the presence of 10% palladized charcoal (2 g.) at room temperature and pressure. The catalyst was filtered off and the solvent removed under vacuum. The resultant oil was mixed with cold water, neutralized with sodium hydroxide, and extracted with chloroform. This extract was dried ($MgSO_4$) evaporated and distilled to form ethyl α-methyl-β-(2-pyridyl) propionate as a pale yellow oil (42.6 g.), B.P. 99–104°/0.15 mm. (Found: C, 67.95%; H, 8.05%; N, 7.2%. $C_{11}H_{15}NO_2$ required C, 68.4%; H, 7.8%; N, 7.25%.)

(c) Preparation of ethyl α-(2-methylindolizin-1-yl) propionate: 20 g. of ethyl α-methyl-β-(2-pyridyl) propionate (prepared in step (b)) in dry acetone (50 ml.) was heated under reflux with bromoacetone (16 g.) on a water bath for 1 hour, cooled and the acetone removed in vacuo. The gum obtained was dissolved in water (360 ml.) and boiled with sodium bicarbonate (36 g.) for 1 hour. The solution was cooled, extracted with ether and the aqueous layer acidified with acetic acid. Ether extraction gave crude α-(2-methylindolizin-1-yl) propionic acid (16.6 g.) which was esterified in dry ethanol using dry hydrogen chloride. Ethyl α-(2-methylindolizin-1-yl) propionate was an oil, B.P. 116–140/0.16 mm. (Found: C, 71.85%; H, 7.8%; N, 6.0%. $C_{14}H_{17}NO_2$ requires C, 72.7%; H, 7.35%; N, 6.05%.)

(d) Preparation of α-(3-benzoyl-2-methylindolizin-1-yl) propionic acid: Ethyl-α-(2-methylindolizin-1-yl) propionate (4 g.) (prepared as in step (c)) in dry benzene (20 ml.) was treated with benzoyl chloride (2.7 g.). The mixture was kept at room temperature for 3 days, then poured into 10% sodium hydroxide solution and the benzene removed by steam distillation. The oil which was left was extracted into chloroform and the extract dried ($MgSO_4$) and evaporated to give a brown oil (4.3 g.). The oil was dissolved in ethanol (300 ml.) and boiled with 40% potassium hydroxide solution (40 ml.) for 3 hours. After cooling, the solvent was removed under vacuum and the residue was dissolved in water, filtered and acidified with glacial acetic acid to produce α-(3-benzoyl-2-methylindolizin-1-yl) propionic acid (4 g.) which crystallized from methanol as fine yellow-green needles, M.P. 184–5° (decomp.). (Found: C, 72.2%; H, 5.5%; N, 4.45%. $C_{19}H_{17}NO_3 0.5H_2O$ requires C, 72.1%; H, 5.7%; N, 4.45%.)

It will thus be seen that the new compound of the present invention in its acid form, namely α-(3-benzoyl-2-methylindolizin-1-yl)propionic acid has unexpected and unique pharmacological properties even as compared with relatively closely related compounds. It is administered to animals in the manner and amounts described above under the test results, but in general it has been found that the best results are obtained using a dosage range of 10–100 mg./kg. although some variation from this dosage range is permissible. The salts are administered in equivalent amounts, that is, the amounts which when the salts break down in the body give the desired dosage of active acid compound AI4884.

What is claimed is:

1. The compound α-(3-benzoyl-2-methylindolizin-1-yl) propionic acid.
2. A pharmaceutically acceptable non-toxic salt of the compound of claim 1.
3. A salt according to claim 2 which is an alkali metal, ammonium or protonated amine salt.

References Cited

Cardellini et al., Chem. Abstracts, vol. 70 pp. 325–6, Item No. 77,753a, Apr. 28, 1969.

ALAN L. ROTMAN, Primary Examiner

U.S. Cl. X.R.

260—295 R; 424—266